(12) United States Patent
Keech et al.

(10) Patent No.: US 10,929,667 B2
(45) Date of Patent: Feb. 23, 2021

(54) WAVEGUIDE-BASED OPTICAL SYSTEMS AND METHODS FOR AUGMENTED REALITY SYSTEMS

(71) Applicant: Corning Incorporated, Corning, NY (US)

(72) Inventors: John Tyler Keech, Painted Post, NY (US); Mark Francis Krol, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/156,355

(22) Filed: Oct. 10, 2018

(65) Prior Publication Data
US 2019/0114484 A1 Apr. 18, 2019

Related U.S. Application Data

(60) Provisional application No. 62/572,109, filed on Oct. 13, 2017.

(51) Int. Cl.
*G06K 9/00* (2006.01)
*G02B 27/00* (2006.01)
(Continued)

(52) U.S. Cl.
CPC ..... *G06K 9/00671* (2013.01); *G02B 6/12007* (2013.01); *G02B 6/1221* (2013.01);
(Continued)

(58) Field of Classification Search
CPC ............ G06K 9/00671; G02B 27/0081; G02B 27/0172; G02B 6/12007; G02B 6/1221; G02B 2027/0178
See application file for complete search history.

(56) References Cited

U.S. PATENT DOCUMENTS 5,335,303 A * 8/1994 Buchecker ............ C07C 229/64
385/122
5,852,702 A * 12/1998 Nishida .................... B41J 2/465
385/130
(Continued)

FOREIGN PATENT DOCUMENTS

WO  2017060665 A1  4/2017
WO  2017095721 A1  6/2017

OTHER PUBLICATIONS

International Search Report and Written Opinion PCT/US2018/055399 dated Jan. 18, 2019, 12 Pgs.
(Continued)

*Primary Examiner* — Ryan A Lepisto
(74) *Attorney, Agent, or Firm* — Smit Kapadia

(57) ABSTRACT

An augmented reality optical system comprises a waveguide structure that includes a waveguide layer supported by a substrate. An input grating and an output grating reside within the waveguide layer and are laterally spaced apart. Input light from a display is made incident upon the input grating. The input light is coupled into the waveguide layer and travels therein as multiple guided modes to the output grating. The input and output gratings provide phase matching so that the guided modes are coupled out of the waveguide layer by the output grating continuously along the output grating to form output light. Meantime, light from a scene is transmitted perpendicularly through the output grating so that the output light and the light from the scene are combined by the eye of a user to form an augmented reality image.

30 Claims, 11 Drawing Sheets

(51) Int. Cl.
G02B 6/12 (2006.01)
G02B 6/122 (2006.01)
G02B 27/01 (2006.01)

(52) U.S. Cl.
CPC ..... G02B 27/0081 (2013.01); G02B 27/0172 (2013.01); *G02B 2027/0178* (2013.01)

(56) References Cited

U.S. PATENT DOCUMENTS

| | | | |
|---|---|---|---|
| 6,549,708 B2* | 4/2003 | Worchesky | G02B 6/12002 385/11 |
| 7,720,334 B1* | 5/2010 | Mossberg | G02B 6/124 385/129 |
| 2007/0019910 A1* | 1/2007 | Greiner | G02B 5/32 385/37 |
| 2011/0038588 A1* | 2/2011 | Kim | G02B 6/124 385/131 |
| 2014/0140653 A1 | 5/2014 | Brown et al. | |
| 2017/0235219 A1 | 8/2017 | Kostamo | |

OTHER PUBLICATIONS

Kress et al; "A Review of Head-Mounted Displays (HMD) Technologies and Applications for Consumer Electronics"; Proc. of SPIE, vol. 8720; pp. 87200A-1-87200A-13.

Kress et al; "A Review of Head-Mounted Displays (HMD) Technologies and Applications for Consumer Electronics"; Proc. of SPIE, vol. 8720; pp. 87200A-1-87200A-13, Jun. 2013.

* cited by examiner

WAVEGUIDE-BASED OPTICAL SYSTEMS AND METHODS FOR AUGMENTED REALITY SYSTEMS

This application claims the benefit of priority under 35 U.S.C. § 119 of U.S. Provisional Application Ser. No. 62/572,109, filed on Oct. 13, 2017, the content of which is relied upon and incorporated herein by reference in its entirety.

FIELD

The present disclosure relates to augmented reality (AR) systems, and in particular to waveguide-based optical systems and methods for AR systems.

BACKGROUND

AR systems are used to add virtual objects to a real visual scene being observed by a user. An example type of AR system is wearable and utilizes eyewear in the form of eyeglasses, goggles or a helmet worn by a user, and are sometimes referred to as head-mounted display (HMDs) systems. The AR system usually includes an optical system configured to allow for viewing an object or a scene while also adding an augmenting object to the actual object or to the scene being viewed directly.

AR systems typically perform five main functions. The first is to place the augmenting object away from the user's eye. The second is to transform the augmented object into a scale invariant and shift invariant form. The third is to shift the transformed augmenting object in front of the user's eye while allowing the light rays from the real scene to pass through undisturbed. The fourth is to scale the transformed and shifted augmenting object to maximize the eye box in front of the user's eye. The fifth is to combine rays from both the real scene and transformed, shifted, and scaled augmenting object and allow the user's eye to form a real image of the augmented scene.

Several different optical system designs for AR systems have been proposed, including those that employ various combinations of one or more types of optical elements such as beam splitters, off-axis lenses, mirrors (including micromirrors), light guides, diffractive optical elements (DOEs), and holographic optical elements (HOEs).

The use of light guides is advantageous in that they can provide for compact designs that are especially useful for AR eyewear. However, the light guides employed to date tend to be relatively thick, i.e., they are described by the principles of geometric optical rather than by the electromagnetic theory of waveguides. As such, they have a relatively limited (narrow) field of view (e.g., in the 30° to 50° range) and must be made to very tight geometrical tolerances (e.g., micron scale) so that the outputted light provides a high-quality image. In addition, the outcoupling of light from a light guide is discrete rather continuous over the output region of the light guide due to the light traversing the light guide as light rays rather than as true guided waves.

SUMMARY

Disclosed herein is an AR optical system for use in an AR system to form an augmented image of an object or a scene being viewed by a user. The AR optical system comprises a waveguide structure that includes a waveguide layer supported by a substrate. An input grating and an output grating reside within the waveguide layer and are laterally spaced apart. Input light from a display is made incident upon the input grating. The input light is coupled into the waveguide layer and travels therein as multiple guided modes to the output grating. The input and output gratings provide phase matching so that the guided modes are coupled out of the waveguide layer by the output grating continuously along the output grating to form output light. Meantime, light from a scene is transmitted perpendicularly through the output grating so that the output light and the light from the scene are combined by the eye of a user to form an augmented reality image.

An aspect of the disclosure is an augmented reality optical system for use in an augmented reality system at an operating wavelength. The system comprises: a substrate having an index of refraction $n_S$ at the operating wavelength, a top surface and a bottom surface; an input grating and an output grating each formed either in or on the top surface of the substrate and laterally spaced apart from each other; a waveguide layer having a body, a top surface, a bottom surface and a thickness 1 µm≤THG≤100 µm, with the bottom surface of the waveguide layer supported on the top surface of the substrate so that the input and output gratings extend into the waveguide layer, and wherein the waveguide layer has an index of refraction $n_G \geq n_S$ at the operating wavelength and supports multiple guided modes; and wherein the input and output gratings provide phase matching so that input light that is incident upon the input grating is coupled into the waveguide layer and travels in the guided modes to the output grating, and is coupled out of the waveguide layer by the output grating as output light.

Another aspect of the disclosure is an augmented reality system for viewing an object or a scene and that comprises the augmented reality optical system described above and having a front region and a back region; a display apparatus disposed in the back region and that generates the input light; and a coupling optical system operably arranged relative to the display apparatus and configured to direct the input light to the input grating of the augmented reality optical system over an input field of view.

Another aspect of the disclosure is an augmented reality optical system, comprising: a waveguide structure comprising a waveguide layer of refractive index $n_G$ and a thickness THG in the range 1 µm≤THG≤100 µm, the waveguide structure supported on a substrate having a refractive index $n_S$, wherein $n_G - n_S \geq 0.5$, and wherein the waveguide structure supports multiple guided modes; and an input grating and an output grating that each reside within the waveguide layer, wherein the input and output gratings provide phase matching and are laterally spaced apart from one another.

Another aspect of the disclosure is a method of forming an augment reality image when viewing an object or a scene. The method comprises: directing display light from a display image to an input grating of a waveguide structure over an input field of view to form multiple guided modes that travel in the waveguide structure; outcoupling the multiple guide modes over an output field of view using an output grating of the waveguide structure, wherein the output grating is phase matched to and spaced apart from the input grating; viewing the object or the scene with an imaging optical system through the output grating while receiving the output light from the output grating with the imaging optical system; and forming with the imaging optical system an augmented image that combines the display image and an image of the object or the scene.

The AR optical systems and AR systems disclosed herein have advantages over conventional AR optical systems and AR wearable systems. One advantage is that the waveguide structure allows for the AR optical system to have a relatively slim form factor, which is important for AR wearable systems such as AR eyeglasses and AR goggles. Another advantage is that that waveguide structure can be deformed (bent) without substantial adverse effects on imaging. Another advantage is that the materials used are inexpensive and the designs relatively easy to fabricate. Another advantage is that the waveguide structure allows for relatively large FOVs, e.g., from 50° to 70°. Another advantage is that the relatively thin design allows for excellent transmission of the light from the object or scene being viewed through the AR optical system. Yet another advantage is that the waveguide structure allows for substantially continuous light extraction over the length of the output grating as compared to a conventional light guide where the light extraction is discrete due to the light-ray-based functionality of light guides.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the description below, $\lambda$ denotes an operating wavelength of light, while $\Delta\lambda$ denotes an operating wavelength range of light (i.e., a spectral band) that includes the operating wavelength. Also, $\theta$ denotes an angle while $\Delta\theta$ denotes an angular range, which in an example denotes the field of view (FOV).

The various refractive indices cited below are for the operating wavelength $\lambda$, which in an example is a visible wavelength. In an example, the spectral band $\Delta\lambda$ comprises visible wavelengths.

AR Optical System

Figure 1:
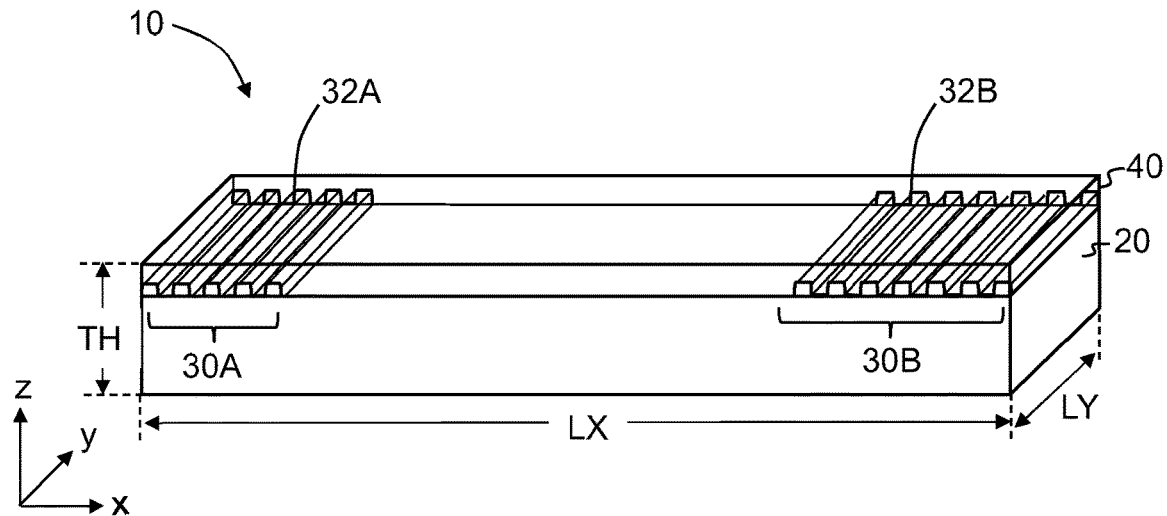
FIG. 1 is an elevated schematic view of an example waveguide-based AR optical system according to the disclosure.
Figure 2:
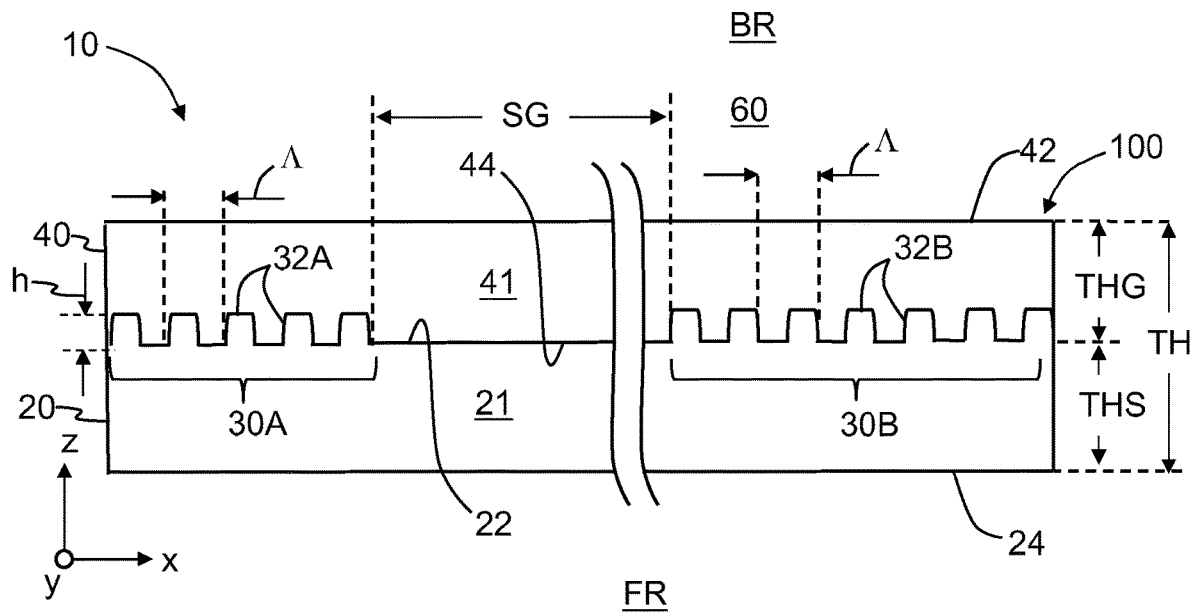
FIG. 2 is a cross-sectional view of the example AR optical system FIG. 1.

FIG. 1 is an elevated schematic view of an example waveguide-based AR optical system ("AR optical system") 10 according to the disclosure, while FIG. 2 is a cross-sectional view of the example AR optical system of FIG. 1. The AR optical system has a length LZ in the x-direction, a length LY in the y-direction and an overall thickness TH in the z-direction, as best seen in FIG. 1.

The AR optical system 10 has a substrate 20 with a body 21, a top surface 22 and a bottom surface 24. The body 21 of substrate 20 has an index of refraction $n_S$ and a thickness THS. In the example shown, the substrate 20 is planar, though other non-planar configurations can be used as described below.

The top surface 22 of the substrate includes a first grating 30A made up of first grating elements 32A and a second grating 30B made up of grating elements 32B. The first and second gratings are spaced apart in the x-direction by a spacing (distance) SG. The first grating 30A is referred to herein as the "input" or "entrance pupil" grating while the second grating 30B is referred to herein as the "output or "exit pupil" grating. The input and output gratings 30A and 30B each have the same period $\Lambda$ and grating height h.

In one example, one or both of the first and second grating elements 32A and 32B are formed in the substrate so that the first and second grating elements are made of the substrate material. This can be accomplished using a masking process, an etching process, a replication process, or a molding process. In another example, one or both of the first and second grating elements 32A and 32B are added to the top surface of the substrate, e.g., via selective deposition process or a replication process. Deposited or replicated first and/or second grating elements 32A and 32B can be made of a variety of materials, e.g. inorganic materials such as oxides or organic materials such as acrylates, with substantially the same refractive index as the substrate 20. As discussed below, the input and output gratings 30A and 30B provide phase matching with respect to light inputted and outputted from the AR optical system 10, as described in greater detail below.

The AR optical system 10 also includes a waveguide layer 40 that resides immediately upon the top surface 22 of the substrate 20. The waveguide layer 40 has a body 41, top surface 42 and a bottom surface 44, which interfaces (i.e., is in contact with) the top surface 22 of the substrate 20. Thus, a first portion of the body 41 fills the spaces between the first grating elements 32A while a second portion of the body fills the spaces between the second grating elements 32B. The waveguide layer 40 has a refractive index $n_G$, wherein $n_G > n_S$. The waveguide layer 40 has a thickness THG.

In an example configuration of the AR optical system 10, the top surface 42 of the waveguide layer 40 interfaces with an ambient environment 60, which in one example comprises air having a refractive index $n_A \approx 1$. In another example configuration illustrated in FIG. 3, the top surface 42 of the waveguide layer 40 is interfaced with a cap layer 50 having a refractive index $n_C < n_G$. The cap layer 50 has a top surface 52 and a bottom surface 54, which is in contact with the top surface 42 of the waveguide layer.

The substrate 20, waveguide layer 40 and either the optional cap layer 50 or the ambient environment 60 define a waveguide structure 100 wherein light can propagate within the waveguide layer as guided waves that travel in different guided modes, as described in greater detail below.

The AR optical system 10 has a front region FR immediately adjacent the bottom surface 24 of the substrate 20. The AR optical system 10 also has a back region BR immediately adjacent either the top surface 42 of the waveguide layer 40 or the top surface 52 of the cap layer 50, depending on whether the cap layer 50 is used in the AR optical system.

In an example, the substrate index of refraction (i.e., the refractive index of the body 21 of the substrate) $n_S \leq 1.5$. In an example, the substrate 20 can be made from a conventional glass, such as fused silica. In other examples, the substrate 20 can be made from a plastic or a polymer. In an example, the substrate 20 can be made of a thermoplastic.

Also In an example, the waveguide layer refractive index $n_G \geq 2$. In an example, $n_G - n_S \geq 0.5$. The waveguide layer 40 can also be made of at least one oxide or a combination of a least one oxide material and at least one fluoride material. Example oxide materials for the waveguide layer 40 include thin-films, such as $Ta_2O_5$ and $TiO_2$.

Figure 3:
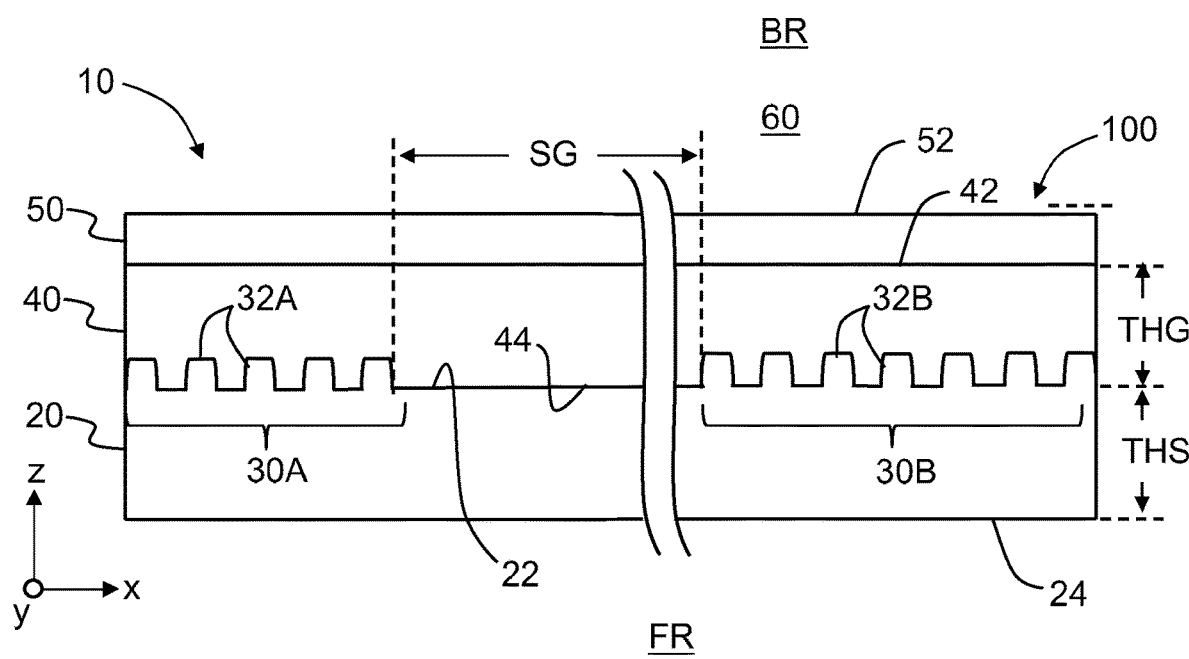
FIG. 3 is a cross-sectional view of an example AR optical system similar to that of FIG. 2 and that further includes a cap layer.
Figure 4:
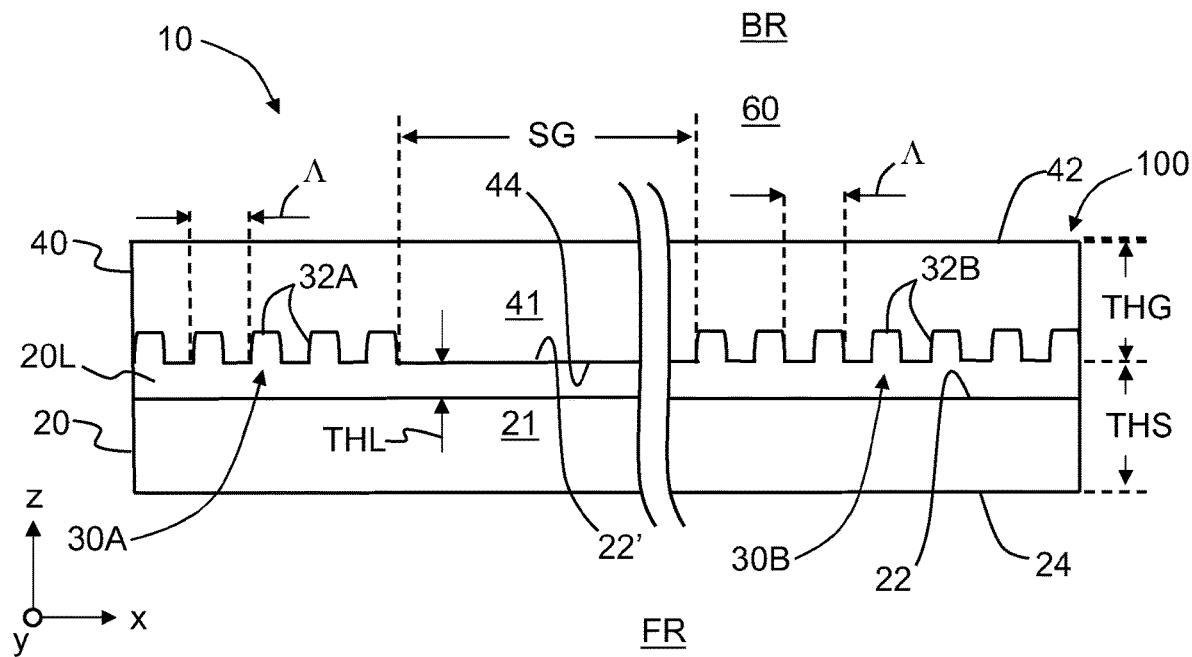
FIG. 4 is a cross-sectional view of an example AR optical system similar to that of FIG. 2 and further includes a low-index layer that resides immediately adjacent the bottom surface of the waveguide layer.

FIG. 4 is similar to FIG. 3 and illustrates an example configuration wherein waveguide structure 100 includes a low-index layer 20L having a refractive index $n_L < n_S$ and a thickness THL. The low-index layer 20L resides immediately adjacent the bottom surface 44 of the waveguide layer 40. The low-index layer 20L can be added to the substrate 20 on the top surface 22 or can be formed in the top surface and can be considered to define a new substrate top surface 22' that includes or supports the input and output gratings 30A and 30B. In an example, the low-index layer 20L is formed as a low-index thin film such as $MgF_2$, which has a refractive index $n_L = 1.38$.

The Waveguide Structure

As noted above, the waveguide structure 100 is defined by the relatively high-refractive-index waveguide layer 40 surrounded by the relatively low-refractive index of either the ambient environment 60 or the cap layer 50 at the top surface 42 and the substrate 20 or the low-index layer 20L at the bottom surface 44. The waveguiding properties of the waveguide structure 100 are defined mainly by the refractive indices $n_G$, $n_S$ (or $n_L$) and $n_A$ (or $n_C$), as well as by the thickness THG of the waveguide layer 40 and the operating wavelength $\lambda$ of light used.

In a non-limiting example, the thickness THG of the waveguide layer 40 is in the range $1~\mu m \leq THG \leq 100~m$ or in the range from $20~\mu m \leq THG \leq 50~\mu m$. The precise thickness THG of the waveguide layer 40 depends on the substrate refractive index $n_S$ (or the refractive index of $n_L$ of the low-index layer 20L if used) and the refractive index $n_C$ of the cap layer 50 or whether the ambient environment with refractive index $n_A$ is used.

Figure 5:
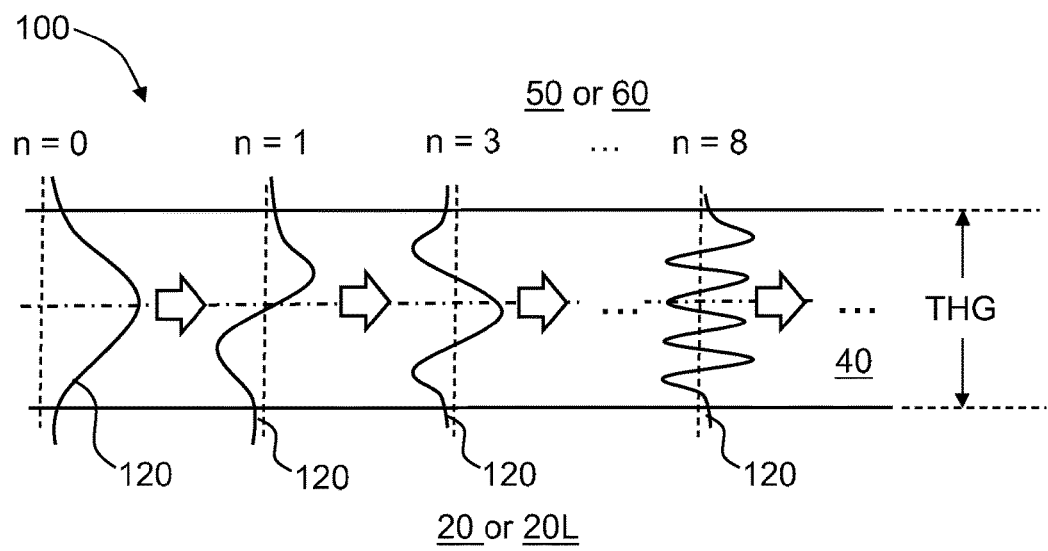
FIG. 5 is a schematic diagram of a portion of an example waveguide structure of the AR optical system illustrating multiple guided modes traveling mainly within the waveguide layer.

FIG. 5 is a schematic diagram of a portion of the waveguide structure 100. The waveguide structure 100 differs from what is often referred to in the art as a light guide or light pipe in that the waveguide structure supports guided modes, which are properly described by the electromagnetic theory of wave propagation rather than rules of geometrical optics. As noted above, in an example the overall waveguide thickness THG of the waveguide layer 40 can be in the range from $1 \leq THG \leq 100~\mu m$, which is relatively thin as compared to conventional light guides which, for example, have a thickness of 250 μm to 1000 μm. In an example, the waveguide thickness THG, is at least 2.5 times thinner than a conventional light guide used in conventional light-guide-based AR optical systems.

FIG. 5 includes guided waves or guided modes 120 propagating mainly in the waveguide layer 40, with tail (evanescent) portions of the guided modes traveling in the adjacent layers. In an example, the waveguide structure 100 supports n=0, 1, 2, . . . m guided modes 120, wherein n is the mode number and m is the highest mode number. The total number of modes is N=m+1 for a given polarization, i.e., TE or TM. The n=0 mode is the fundamental mode and the n>0 modes are the higher-order modes. FIG. 5 shows an example where m=8, which represents a total of N=9 guided modes 120 supported by the waveguide structure 100 for a given polarization.

In an example of the waveguide structure 100, the total number N of guided modes 120 can be in the range $500 \leq N \leq 1000$. The total number of modes N is selected to be large enough to provide sufficient angular resolution and sufficiently large field of view (FOV) and a substantially continuous light extraction for the output light 150' outputted by the output grating 30B while keeping the thickness THG of the waveguide layer 40 to be relatively small, e.g., to 100 μm or smaller. For example, the FOV can be as high as 70°, with even larger FOVs requiring a greater number N of guided modes. Likewise, smaller FOVs require fewer guided modes 120. The AR optical system 10 can of course operate with just a few modes or tens of modes in select cases (e.g., where a relatively narrow field of view is acceptable), but it is anticipated that the AR optical system will be most useful having hundreds of modes to have a relatively large FOV.

Example AR Optical System Parameters

An example AR optical system 10 has a glass substrate 20 (e.g., a borosilicate crown such as BK7) with a substrate refractive index $n_S=1.5$, a waveguide layer 40 made of $Ta_2O_5$ and having a thickness THG=100 μm and a refractive index $n_G=2.15$, and an ambient air environment 60 in contact with the top surface 42 of the waveguide layer. This configuration supports about N=600 guided modes 120 at a visible operating wavelength of λ=520 nm.

In another example similar to that above but where the waveguide layer 40 is made of $Nb_2O_5$ and having a waveguide refractive index $n_G=2.38$, the waveguide structure 100 supports about N=700 modes.

In another example similar to that above but where the waveguide layer 40 is made of $TiO_2$ and having a refractive index $n_G=2.68$, the waveguide structure 100 supports about N=850 modes.

In another example similar to that above but where the substrate 20 supports a low-index layer 20L made of $MgF_2$ and having a refractive index $n_L=1.38$ and wherein the waveguide layer 40 is made of $TiO_2$ having a refractive index $n_G=2.68$, the waveguide structure 100 supports about N=890 modes.

In the examples, the number of modes is calculated using the following equation:

$$N=(2\cdot THG/\lambda)\cdot(n_G^2-n_S^2)^{1/2}.$$

Also in an example, the input and output gratings 30A and 30B can each have the following parameters: the grating period (or pitch) Λ in the range from 200 nm to 600 nm and the grating element height h in the range from 50 nm to 500 nm.

The Input and Output Gratings

Figure 6A:
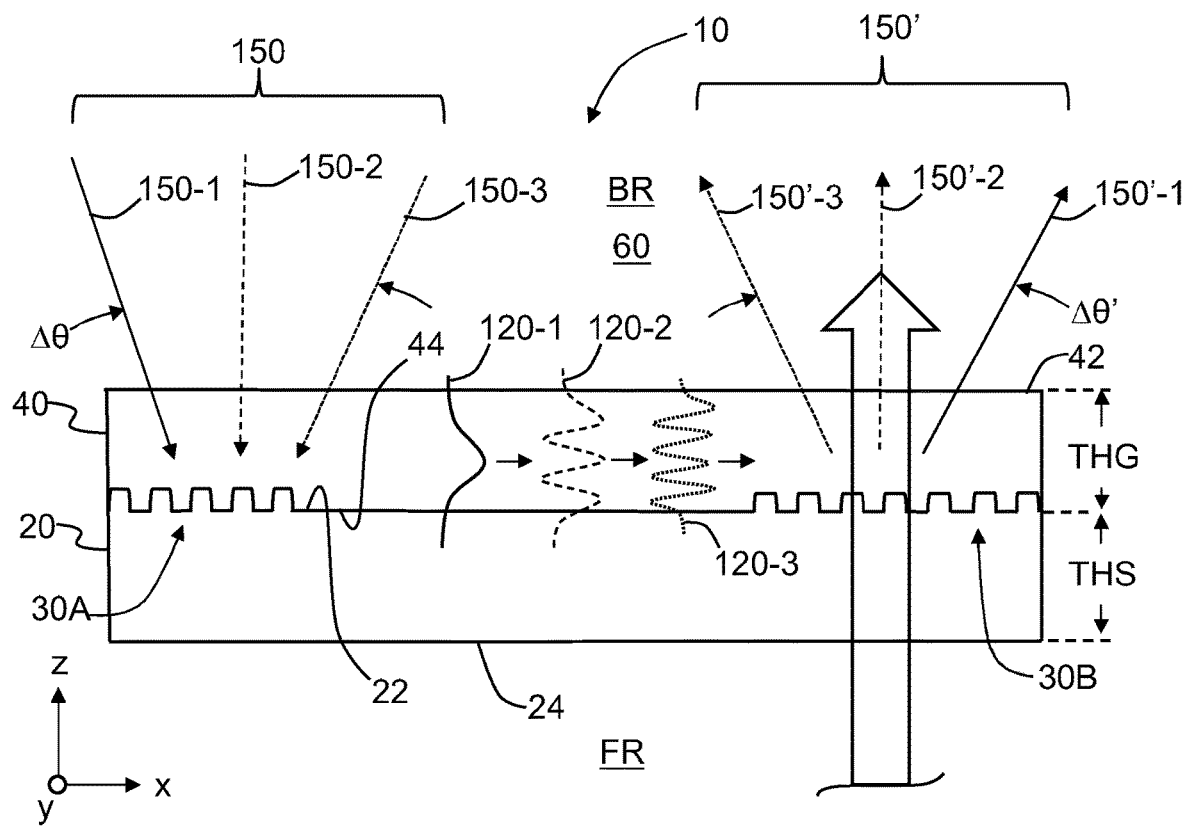
FIG. 6A is similar to FIG. 2 and illustrates the basic principles of operation of the AR optical system disclosed herein.
Figure 6B:
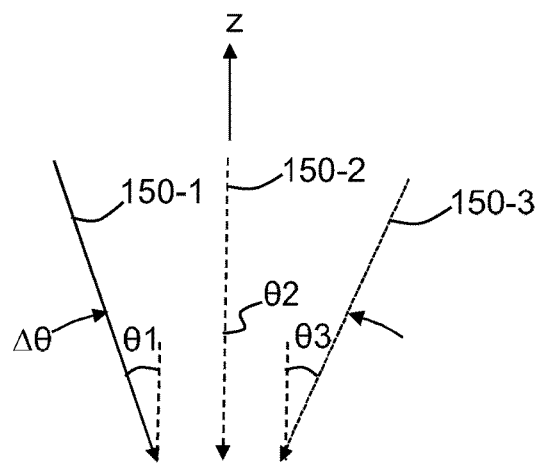
FIG. 6B is a close-up view of the input light showing the input angular range and three example input angles within the input angular range.

FIG. 6A is similar to FIG. 2 and illustrates the basic principles of operation of the AR optical system 10. In FIG. 6A, input light 150 is incident upon the input grating 30A from the back region BR of the AR optical system 10. As discussed below, the input light 150 can be generated by a display that forms a display image. Three different rays of light 150 are denoted 150-1, 150-2 and 150-3 and correspond to different incident angles θ, which in an example can be measured relative to the z axis. Here, the light rays 150-1, 150-2 and 150-3 can be thought of as the direction of propagation of light waves. FIG. 6B is a close-up view of the input light 150 and shows the three different example angles θ1, θ2 and θ3 within an angular range Δθ. The input light 150-1, 150-2 and 150-3 travels generally in the −z direction from the back region BR toward the input grating 30A.

The input light 150-1, 150-2 and 150-3 of different angles is incident upon and interacts with the input grating 30A, which converts the input light into corresponding different waveguide modes 120-1, 120-2 and 120-3 by virtue of phase matching between the waveguide modes, the input grating, and the input light at different incident angles θ1, θ2 and θ3. Because the waveguide structure 100 supports a limited number of guided modes 120, only input light 150 at select incident angles θ within the input angular range will couple into and travel in the waveguide layer 40 as a guided mode 120. These angles θ are referred to as coupling angles. The greater number of guide modes 120 supported by the waveguide structure 100, the greater number of coupling angles θ. In FIG. 6A, only three incident (coupling) angles θ1, θ2 and θ3 are shown for ease of illustration. As noted above, one can have N=1000 different guided modes 120 so that an incident FOV defined by the input angular range Δθ can have 1000 coupling angles θ.

Figure 6C:
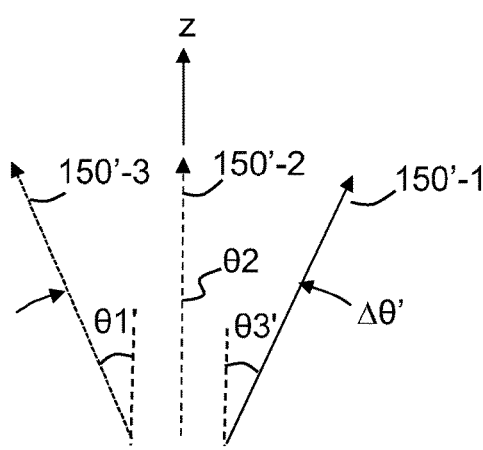
FIG. 6C is a close-up view of the output light showing the output angular range and three example output angles within the output angular range.

The waveguide modes 120-1, 120-2 and 120-3 travel within the waveguide structure 100 to the output grating 30B. The input and output gratings 30A and 30B phase match the waveguide modes 120 to the input light and output light 150 and 150', respectively. Thus, the waveguide modes 120-1, 120-2 and 120-3 are coupled out of the waveguide layer 40 by the output grating 30B as corresponding output light 150'-1, 150'-2 and 150'-3 emitted at output angles θ1, θ2 and θ3 within an output angular range Δθ'=Δθ for output light 150'. FIG. 6C is a close-up view of the output light 150' and shows the three different example output angles θ1', θ2' and θ3' within an angular range Δθ'. As noted above, for N=1000, there can be 1000 different output angles θ'.

In an example when input and output gratings 30A and 30B have the same period Λ, then θ1=θ1', θ2=θ2', θ3=θ3' and Δθ=Δθ' (i.e., the coupling angles equal the corresponding output angles and the input FOV equals the output FOV). The output light 150' travels generally in the +z direction back into the back region BR of the AR optical system 10. Note that the output light 150' is generally displaced in the lateral direction (in FIG. 6A, the x-direction) by the distance SG from the input light 150.

In an example, the input light 150 is polychromatic, i.e., has a wavelength band Δλ. An example wavelength band Δλ comprises or consists of at least a portion of the visible electromagnetic spectrum.

In the case where the input light 150 is polychromatic, each wavelength λ within the wavelength band Δλ will be coupled into the waveguide structure 100 as corresponding guided modes 120 over the input angular range Δθ. The guided modes 120 of the different wavelengths independently propagate within the waveguide structure in the same way that different wavelengths of light propagate in an optical fiber as guided modes for wavelength-division multiplexing (WDM) applications. Due to the phase matching provided by the input and output gratings 30A and 30B, the spectral content and distribution of the output light 150' is the same as (or at least substantially the same as) the input light 150. Thus, the AR optical system 10 is capable of color imaging.

Meanwhile, in an example, different light 250 (e.g., visible light from an object or scene, not shown) travels from the front region FR to the back region BR through the AR optical system 10 and in particular passes through the output grating 30B in the direction perpendicular to the grating elements 32B, i.e., in the +z direction. The light 250 is substantially undistorted by the output grating 30B as it passes therethrough. This is because there is no phase matching provided by the output grating 30B to the light 250.

An advantage of utilizing a waveguide structure 100 in AR optical system 10 is that the output light 150 is emitted substantially continuously along the length of the output grating 30B. This is in contrast to conventional light-guide-based AR systems wherein the light rays get trapped within the light guide by total-internal reflection and only emerge at discrete locations along the light guide. Continuous extraction of the output light 150' along the output grating 30B, as opposed to discrete extraction for a conventional light guide, results in a more uniform light distribution across the output grating (i.e., exit pupil) and thus a corresponding better augmented-image quality as observed by the user.

In an example, the input light 150 can also be substantially monochromatic for monochromatic imaging. Also in an example, the AR optical system 10 can be configured to separately handle different select wavelengths of input light

150. For example, for input light 150 having red (R), green (G) and blue (B) components, three different waveguide structures 100 can be disposed in a stacked configuration and separated using spacing layers (e.g., air or low-index films), with the different waveguide structures respectively configured to handle the R, G and B input light 150. In another example, two waveguide structures 100 can be stacked, with one waveguide structure designed to handle the R and G input light 150 while the other waveguide structure designed to handle G and B input light. Thus, a stacked configuration for an AR optical system 10 operates in essentially the same manner as the non-stacked configuration, with the different wavelengths of the input light 150 traveling in a different waveguide structure.

Example Grating Configurations

Figure 7A:
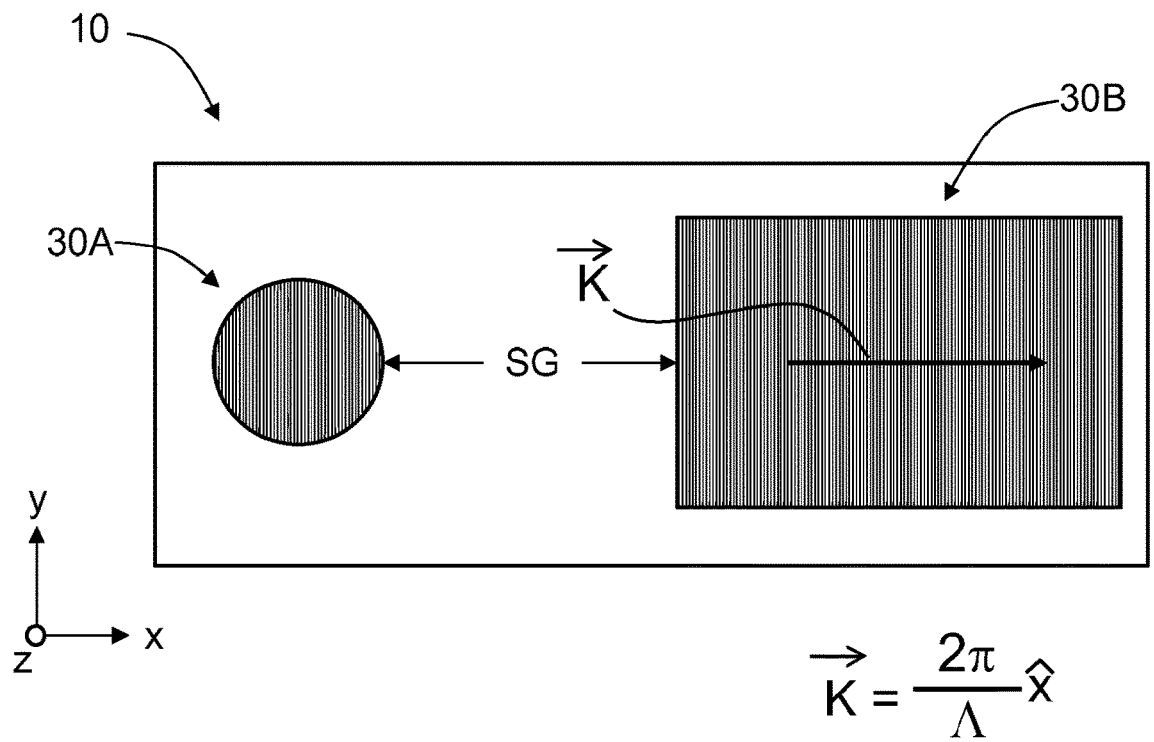
FIGS. 7A through 7D are top-down views of example configurations for the input grating and the output grating of the AR optical system disclosed herein.
Figure 7B:
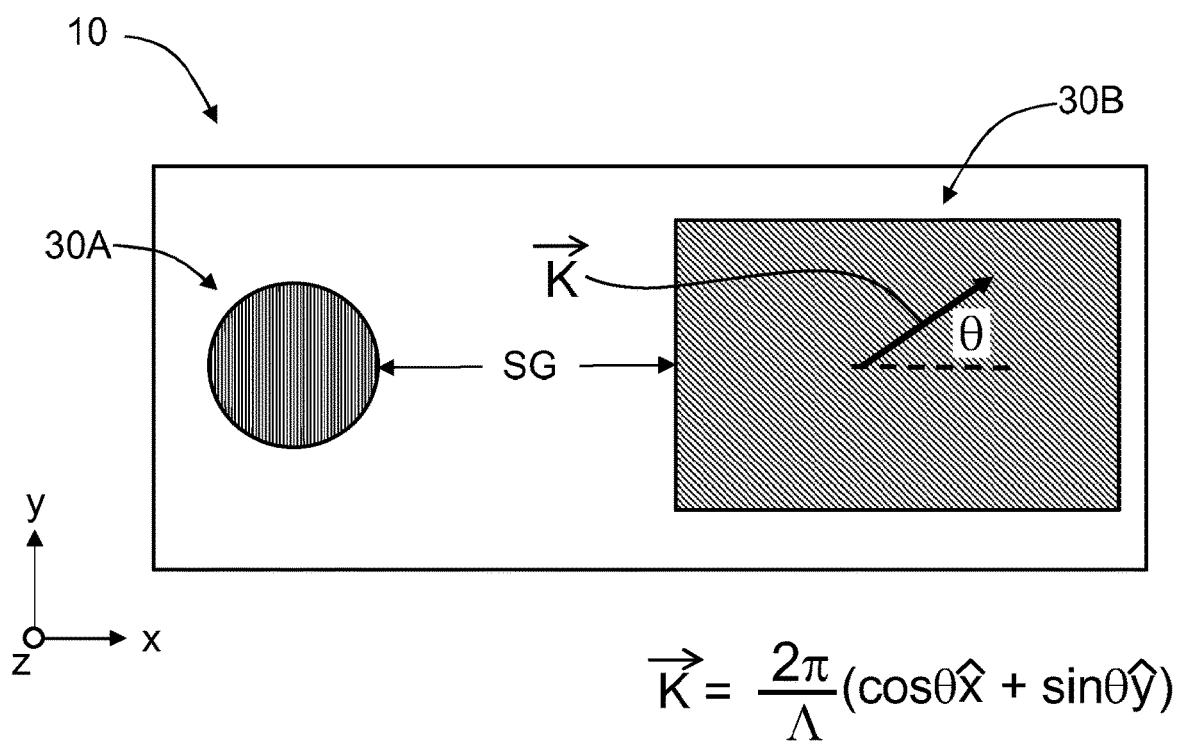

FIGS. 7A through 7D are top-down views of examples of AR optical system 10 illustrating example configurations for the input grating 30A and the output grating 30B. In the examples of FIGS. 7A and 7B, the input grating 30A has linear grating elements 32A and an overall circular shape while the output grating 30B also has linear grating elements 32B but has an overall rectangular shape. Moreover, in the example the input grating 30A has a substantially smaller area than the output grating 30B.

The output grating 30B of FIG. 7A is shown with a propagation vector K that is parallel with the x-axis while the output grating of FIG. 7B has a propagation vector in the x-y plane as defined by the angle θ.

Figure 7C:
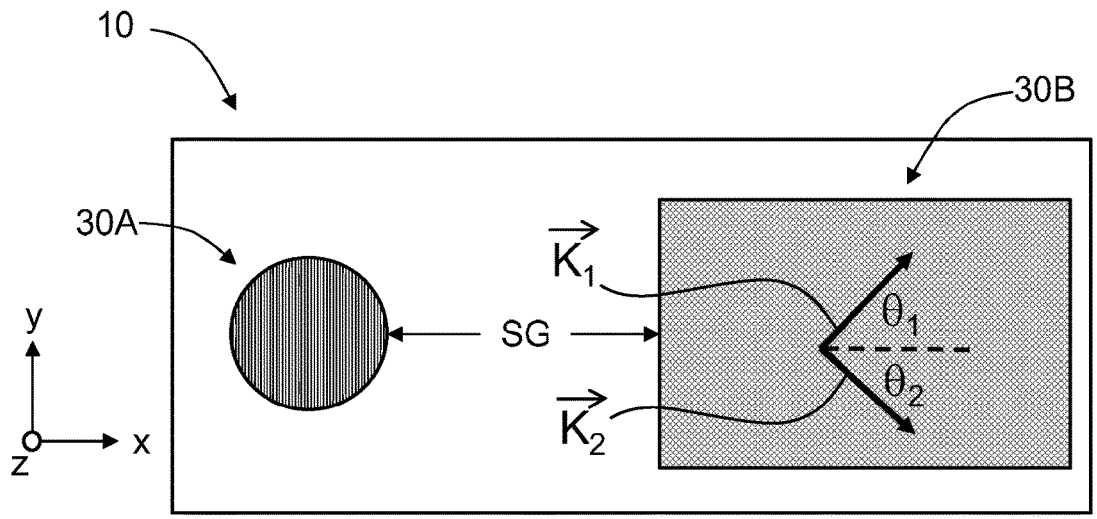

FIG. 7C illustrates an example wherein output grating 30B has a two-dimensional configuration with crossed elements 32A and 32B that define at least two grating momentum vectors $K_1$ defined by $θ_1$ and $K_2$ defined by $θ_2$. The output grating can have additional grating propagation (momentum) vectors $K_i$ defined by angles $θ_i$.

Figure 7D:
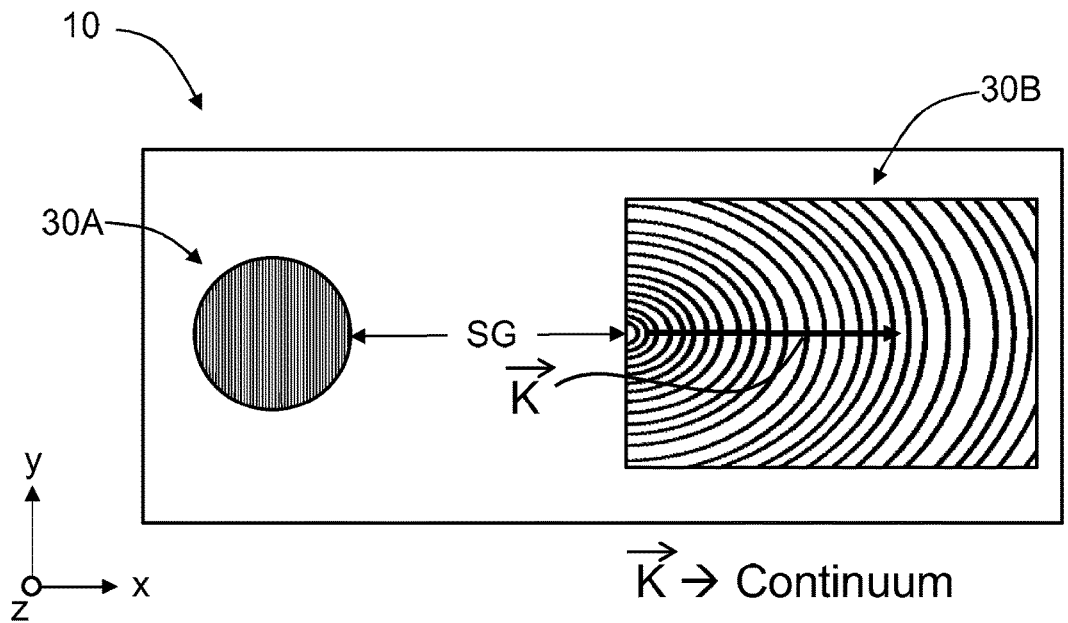

In other examples, the output grating 30B can include curved grating elements 32B, such as shown in FIG. 7D, wherein the grating elements are concentrically arranged to define a continuum of propagation vectors K.

A variety of shapes and sizes for the grating elements 32A and 32B of the input and output gratings 30A and 30B can be effectively employed, depending on the desired functionality of the AR optical system 10. Additionally, the input and/or output grating 30A and/or 30B can comprise two or more discrete grating regions with different types of grating elements 32A and/or 32B. A two-dimensional configuration for the input grating 30A and/or the output grating 30B may be effectively employed in cases where it is desirable to reduce the total area of the AR optical system 10 and to simplify the grating layout.

Curved AR Optical Systems

The AR optical systems 10 described above have a planar configuration by way of example and for ease of illustration and explanation. However, the AR optical system 10 is not so limited and can be curved, i.e., can have one or more curved surfaces.

Figure 8:
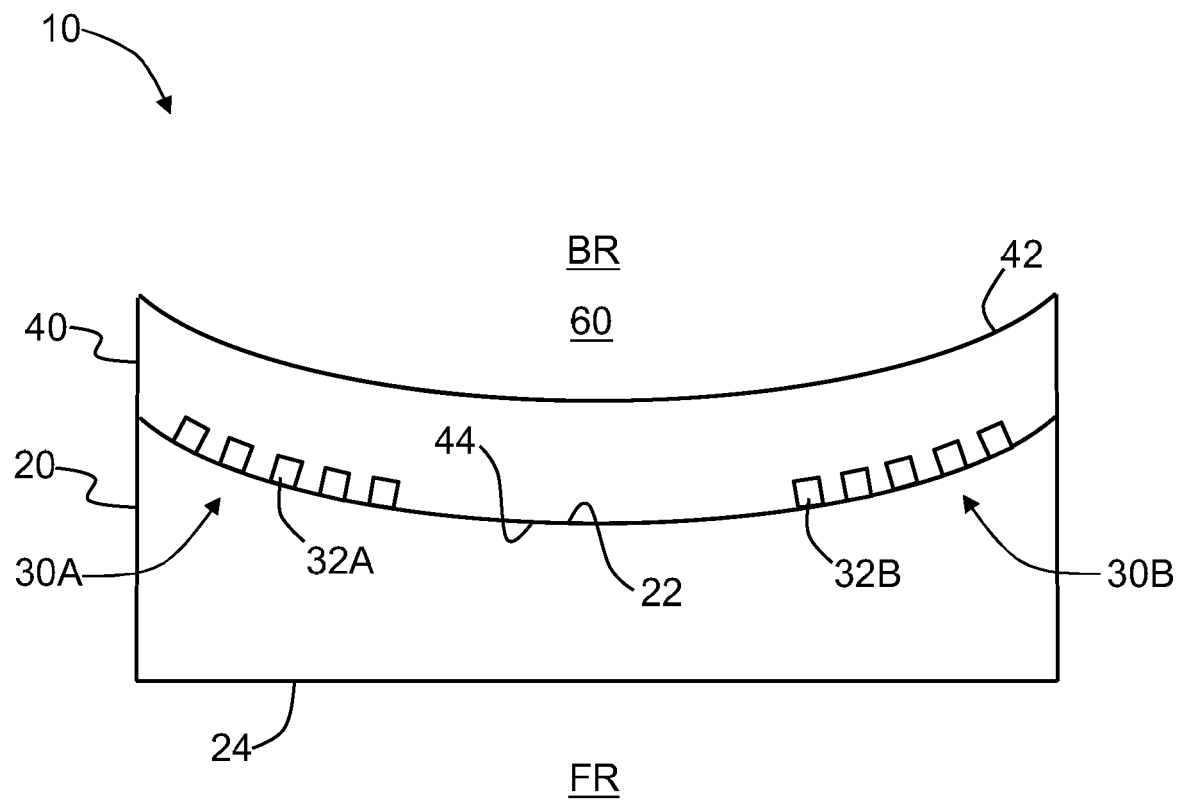
FIGS. 8 through 12 are schematic cross-sectional diagrams of example AR optical systems that include at least one curved surface.
Figure 9:
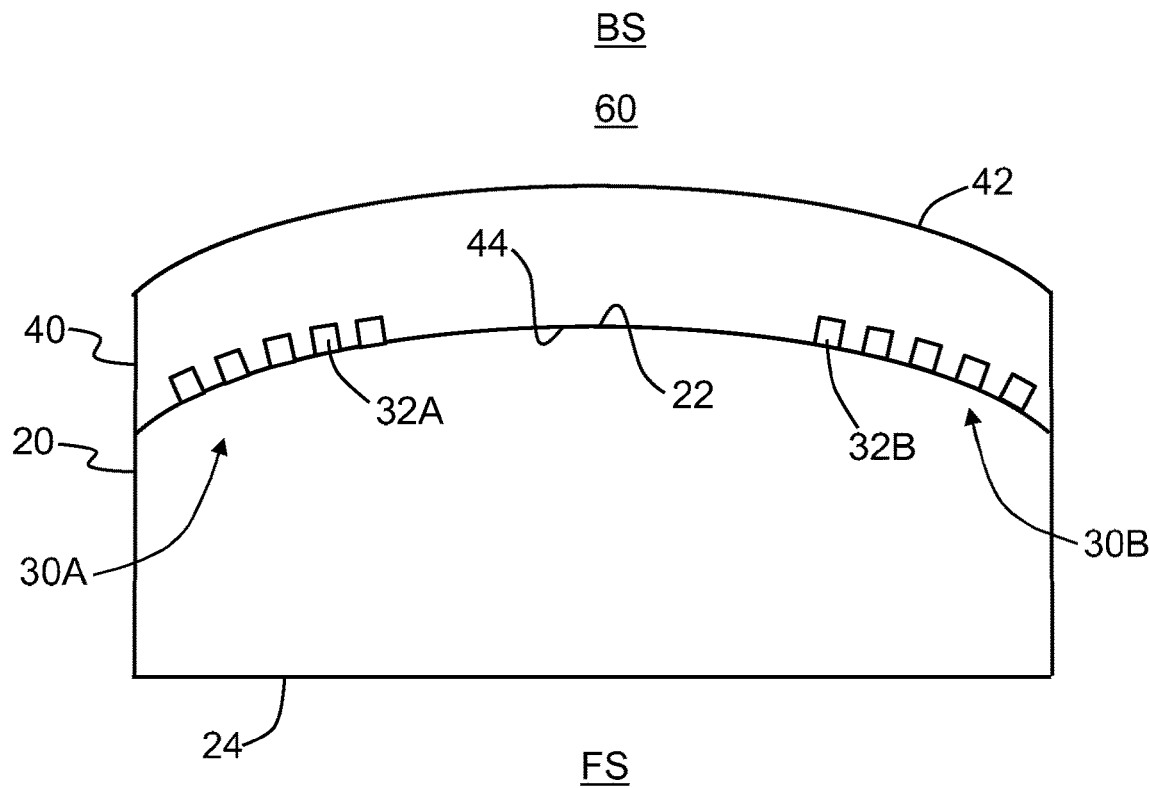
Figure 10:
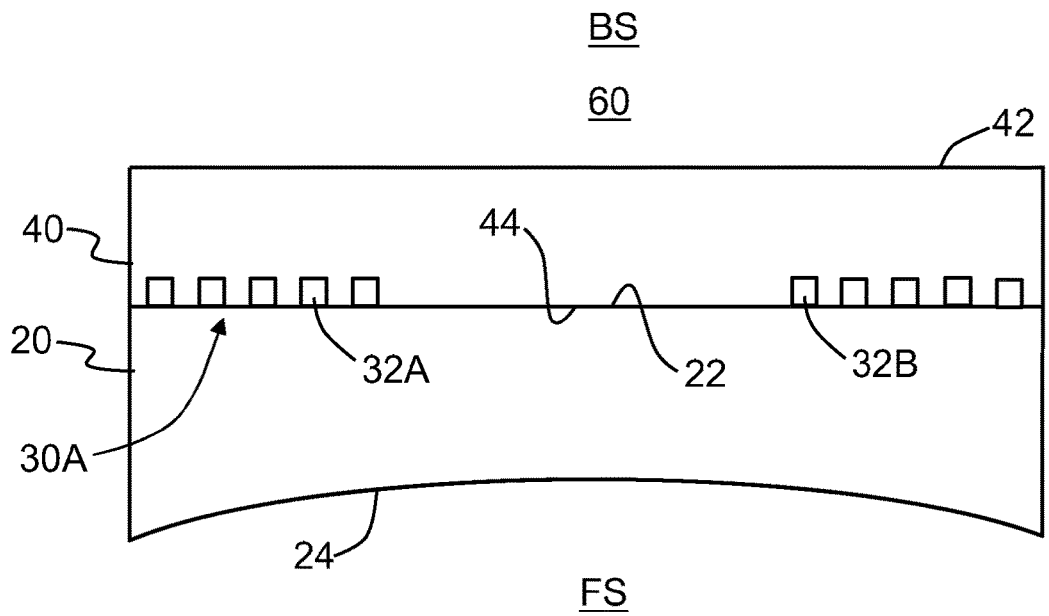
Figure 11:
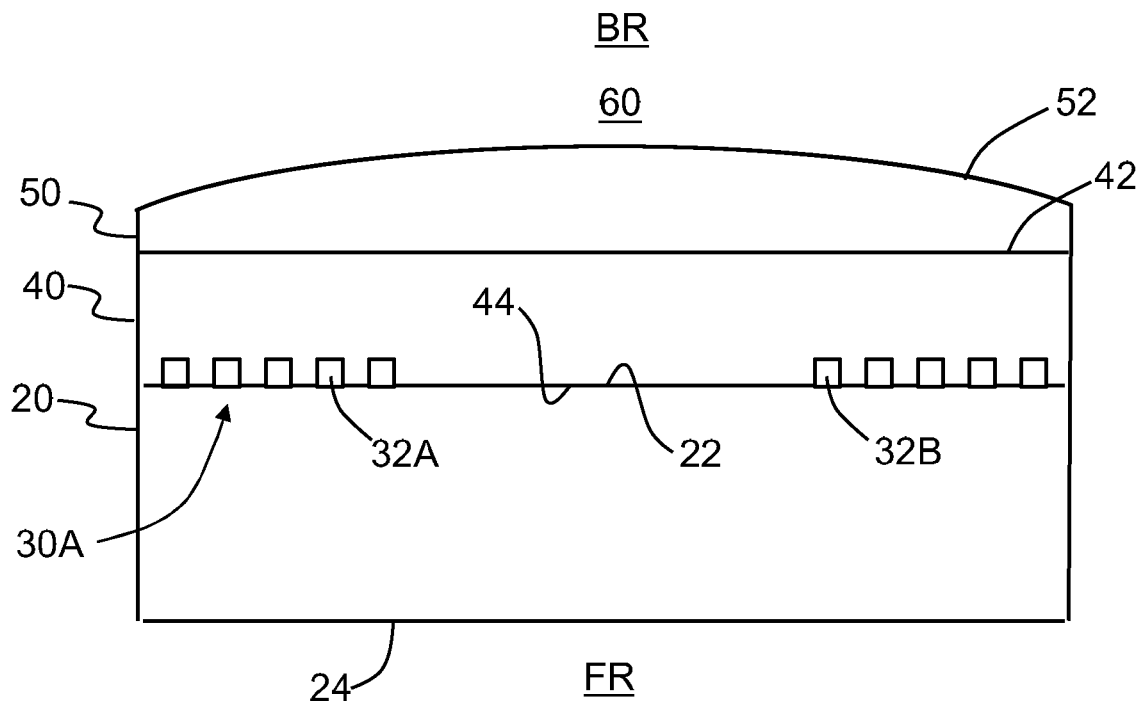

FIG. 8 is similar to FIG. 2 and illustrates an embodiment of the AR optical system 10 having two surfaces with a convex curvature. FIG. 9 is similar to FIG. 8 and illustrates an embodiment of the AR optical system 10 having two surfaces with a concave curvature. Other examples can include just one surface of the AR optical system 10 being curved, such as the bottom-most surface as shown in FIG. 10. FIG. 11 illustrates an example wherein the AR optical system 10 includes the cap layer 50 and the top surface 52 of the cap layer is curved while the waveguide layer 40 is substantially planar.

Figure 12:
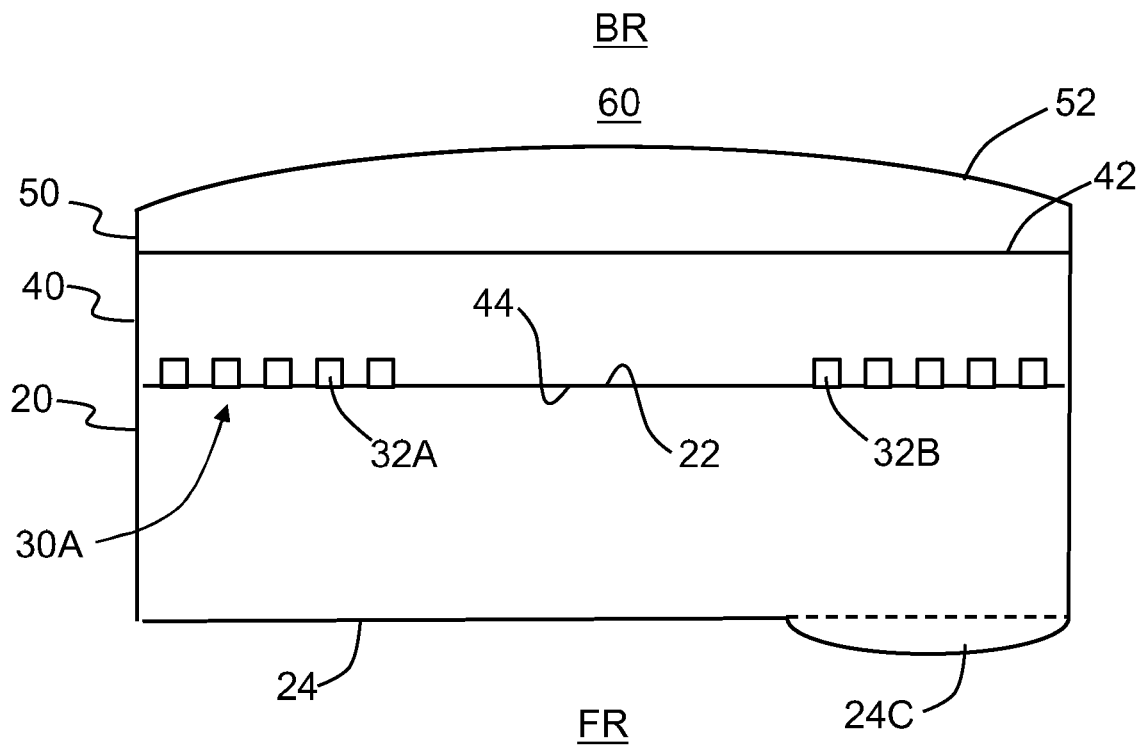

In an example, one or more curved surfaces may be configured to provide corrective imaging. FIG. 12 illustrates an example embodiment wherein the bottom surface 24 of the substrate 20 includes a locally curved portion 24C designed to provide corrective imaging for a user 350 (see FIG. 13A, introduced and discussed below).

In addition, the AR optical system 10 can be configured with the waveguide layer 40 placed on the bottom surface 24 of the substrate 20, and the example configurations disclosed herein show the waveguide layer on the top surface of the substrate for the sake of illustration. In addition, any of the surfaces (or portions thereof) within the AR optical system 10 can be configured as a corrective surface. In examples, the AR optical system 10 can have multiple corrective surfaces. Likewise, various combinations of curvatures (e.g., convex and concave) can be employed beyond the examples shown by way of illustration in FIGS. 8 through 12.

In configurations where the waveguide structure 100 of the AR optical system 10 has a relatively strong curvature, the guided modes 120 may no longer be true bound modes but are more properly described as leaky resonant modes. Leaky resonant modes do not substantially change the operation of the waveguide structure 100, and in fact, may improve angular resolution by coupling a range of input (coupling) angles θ to each mode and opposed to discrete coupling angles to each mode.

In other examples, the grating period Λ of the input and output gratings 30A and 30B may be non-constant (e.g., chirped) to account for any curvature in the waveguide structure 100 and to maintain correct coupling angles θ for the incident light 150 as well as maintaining output angles θ' for the outputted light 150'. The grating height h of the input and output gratings may be non-constant to vary the rate at which input light 150 is coupled in the waveguide structure 100 and output light 150' is coupled out of the waveguide structure, respectively.

AR Systems

Figure 13A:
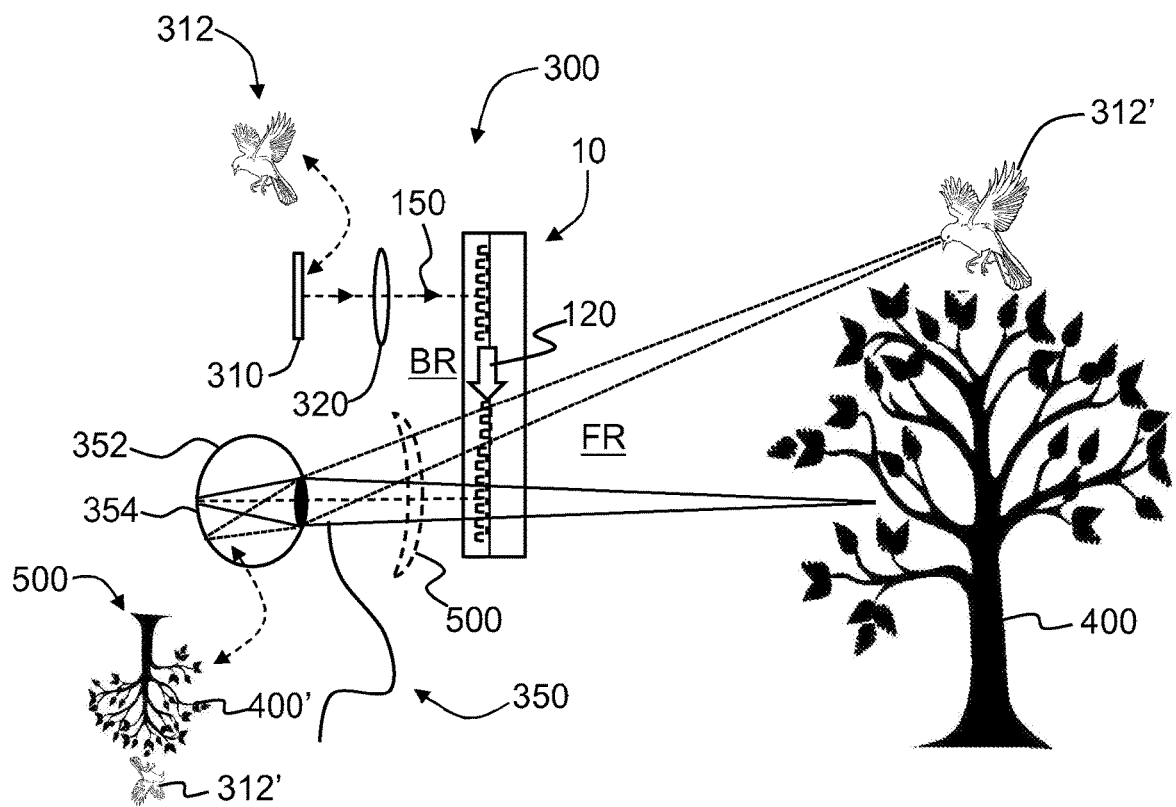
FIG. 13A is a schematic diagram of an example embodiment of an AR system that includes the AR optical system disclosed herein as used by a user, wherein the eye of the user constitutes the imaging optical system.

FIG. 13A is a schematic diagram of an example embodiment of an AR system 300 that includes the AR optical system 10 disclosed herein. A planar configuration of the AR optical system 10 is shown by way of example and for ease of illustration. The AR system 300 includes a display apparatus 310 optically coupled to the input grating 30A of the AR optical system 10 by a coupling optical system 320. In an example, the display apparatus 300 is a micro-display, e.g., a micro-display chip. In an example, the coupling optical system 320 comprises one or more optical elements such as lenses, mirrors, beam splitters, etc. The coupling optical system 320 can comprise micro-optical elements to minimize size and weight.

The AR system 300 is shown disposed relative to a user 350 and relative to a real object 400, which resides adjacent the front region FR of the AR optical system 10 and is shown by way of example as a tree. The real object 400 can also be considered as a scene being viewed by the user through the AR optical system 10. The display apparatus 310 is shown as providing a display image 312, which by way of example is depicted as a bird. The light 150, which constitutes display light associated with the display image 312, is directed to the input grating 30A of the AR optical system 10 over a range Δθ of input (coupling) angles θ (e.g., over an input FOV) by the coupling optical system 320. The input (display) light 150 is optically coupled into the waveguide structure 100 at the select coupling angles θ within the input FOV, as described above, to generate multiple (N) guided modes 120. The N guided modes 120 then travel within the waveguide structure 100 to the output grating 30B, with the input and output gratings 30A and 30B providing phase matching converts the N guided modes 120 to corresponding output light 150' at discrete output angles θ' corresponding to the number N of the guided modes. While the output angles θ' are discrete, the output light 150' is outcoupled substantially continuously over the length of the output grating 30B.

The output light 150' is directed to one or both eyes 352 of the user 350. Likewise, one or both eyes of the user receives light 250 from the object 400 directly through the output grating 30B (see also FIG. 6A). The eye or eyes 352 of the user 350 thus forms an augmented image 500 on the eye's retina 354, wherein the augmented image includes a real image 400' of the object 400 and a virtual image 312' of the display image 312.

In an example, the AR system 300 can optionally include at least one corrective lens 600 operably disposed between the eye 352 of the user 350 and AR optical system 10 to provide corrective imaging, e.g., in case the user's eye has aberrations. In an example, the corrective lens 600 constitutes one or more conventional eyeglass lenses. As noted above, corrective imaging can also be provided by at least a portion of one or more of the surfaces waveguide structure 100 being curved.

Figure 13B:
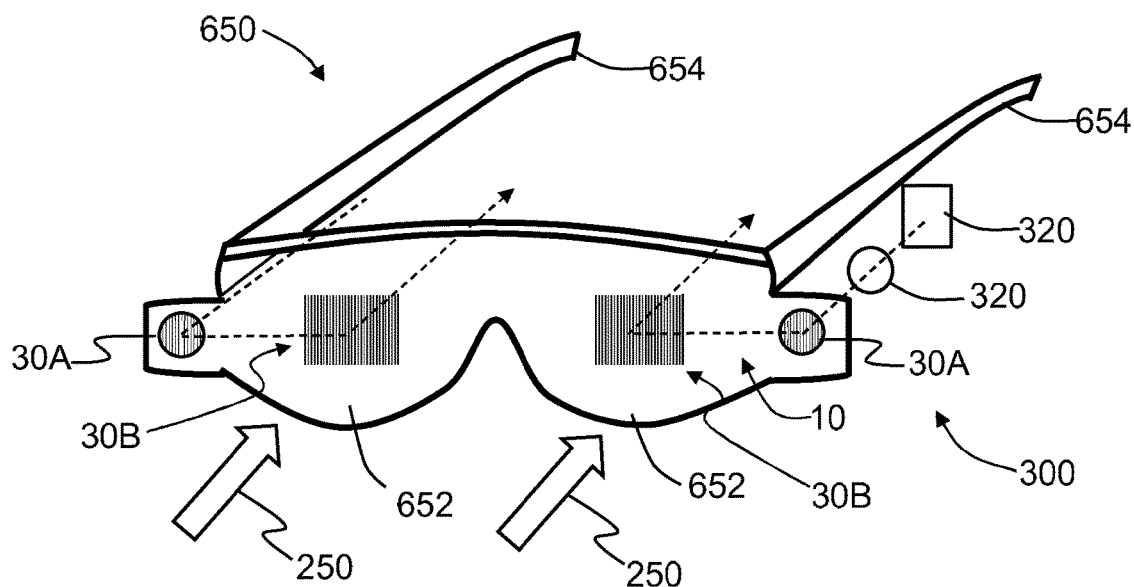
FIG. 13B is a schematic diagram of example AR eyewear that incorporates the AR system disclosed herein and that can be worn by the user.

FIG. 13B is a schematic diagram of example AR eyewear 650 that incorporates the AR system 10 disclosed herein and that can be worn by the user 350. The AR eyewear includes lenses 652 and temples 654. In the example shown, each lens 352 includes an output grating 30B. The input gratings 30A reside at respective outer portions of the lenses 352. At least a portion of each of the lenses 352 includes the waveguide structure 100 described above. The display apparatuses (e.g., micro-displays) 310 and the coupling optical systems 320 can be supported by each of the temples 654 (only one display and coupling optical system are shown for ease of illustration).

Figure 14:
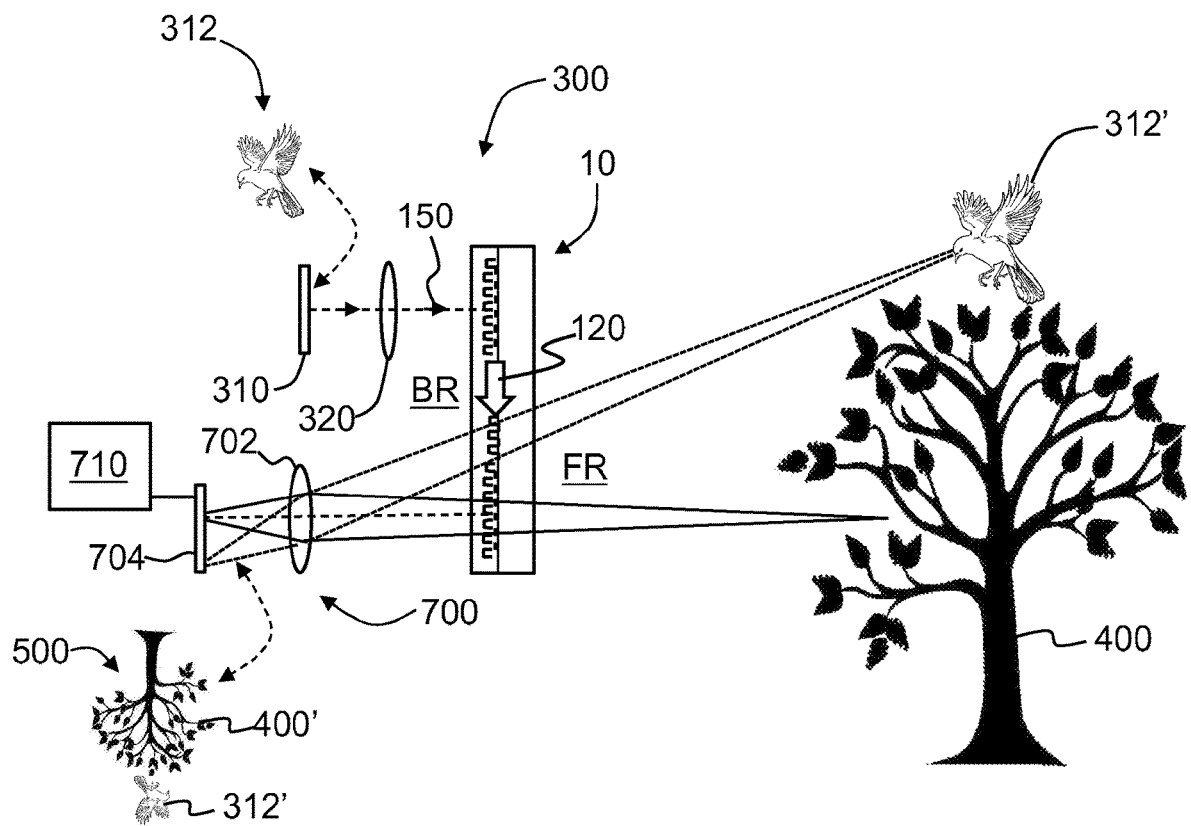
FIG. 14 is similar to FIG. 13A and illustrates an example where the AR system includes an imaging optical system that includes an imaging lens and an image sensor rather than the eye of the user as shown in FIG. 13A.

FIG. 14 is similar to FIG. 13A and illustrates an example embodiment of the AR system 300 wherein the user 350 is replaced with an imaging optical system 700, i.e., the imaging optical system replaces the user's eye(s) 352. The imaging optical system 700 includes an imaging lens 702 and an image sensor 704 on which is formed the augmented image 500. In an example, the imaging optical system 700 comprises a digital camera. In an example, the image sensor 704 is operably coupled to image processing electronics 710, e.g. such as associated with a digital camera. In an example, the user's eye 352 constitutes an example of an imaging optical system 700, with the user's brain performing the necessary image processing of the augmented image 500.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An augmented reality optical system for use in an augmented reality system at an operating wavelength, comprising:
    a substrate having an index of refraction ns at the operating wavelength, a top surface and a bottom surface;
    an input grating and an output grating each formed either in or on the top surface of the substrate and laterally spaced apart from each other;
    a waveguide layer having a body, a top surface, a bottom surface and a thickness 1 µm≤THG≤100 µm with the bottom surface of the waveguide layer supported on the top surface of the substrate so that the input and output gratings extend into the waveguide layer, and wherein the waveguide layer has an index of refraction $n_G \geq n_S$ at the operating wavelength and supports multiple guided modes;
    wherein the input and output gratings provide phase matching so that input light incident upon the input grating is coupled into the waveguide layer and travels in the guided modes to the output grating, and is coupled out of the waveguide layer by the output grating as output light.

2. The augmented reality system according to claim 1, wherein the substrate refractive index $n_S \leq 1.5$ and the waveguide layer refractive index $n_G \geq 2$ at the operating wavelength.

3. The augmented reality system according to claim 2, wherein the number of multiple guided modes is between 500 and 1000.

4. The augmented reality optical system according to claim 1, wherein the waveguide layer has a thickness THG in the range 25 µm≤THG≤50 µm.

5. The augmented reality optical system according to claim 1, wherein the waveguide layer has a thickness THG in the range 30 µm≤THG≤40 µm.

6. The augmented reality optical system according to claim 1, wherein the waveguide layer comprises a polymer and the substrate comprises a glass.

7. The augmented reality optical system according to claim 1, wherein the substrate comprises a glass material and wherein the waveguide comprises at least one of an oxide material and a fluoride material.

8. The augmented reality optical system according to claim 1, wherein the substrate comprises a glass material, wherein the input and output gratings comprise a polymer, and wherein the waveguide layer comprises either an oxide material or a combination of an oxide material and a fluoride material.

9. The augmented reality optical system according to claim 1, wherein the substrate comprises a polymer material and the waveguide layer comprises either an oxide material or a combination of an oxide material and a fluoride material.

10. The augmented reality optical system according to claim 9, wherein the polymer material comprises a thermoplastic.

11. The augmented reality optical system according to claim 9, wherein the waveguide layer comprises silicon.

12. The augmented reality optical system according to claim 1, wherein the waveguide layer and the substrate are each planar.

13. The augmented reality optical system according to claim 1, wherein at least one of the waveguide layer and the substrate has a curved surface.

14. The augmented reality optical system according to claim 1, further comprising a cap layer disposed on the top surface of the waveguide layer, wherein the cap layer has an index of refraction $n_C < n_G$.

15. The augmented reality optical system according to claim 1, wherein the input grating comprises linear input grating elements and wherein the output grating comprises linear output grating elements.

16. The augmented reality optical system according to claim 1, wherein the input grating comprises two-dimensional input grating elements and wherein the output grating comprises two-dimensional output grating elements.

17. The augmented reality optical system according to claim 1, wherein the output light has a field of view (FOV) in the range 50°≤FOV≤70°.

18. The augmented reality optical system according to claim 1, wherein the input light is polychromatic.

19. The augmented reality optical system according to claim 1, wherein the input light is monochromatic.

20. The augmented reality optical system according to claim 1, wherein the substrate comprises a low-index layer that defines the substrate top surface, wherein the low-index layer has an index of refraction $n_L < n_S$.

21. An augmented reality system for viewing an object or a scene, comprising:
   an augmented reality optical system having a front region and a back region, wherein the augmented reality optical system comprises:
      a substrate having an index of refraction $n_S$ at the operating wavelength, a top surface and a bottom surface,
      an input grating and an output grating each formed either in or on the top surface of the substrate and laterally spaced apart from each other,
      a waveguide layer having a body, a top surface, a bottom surface and a thickness 1 µm≤THG≤100 µm with the bottom surface of the waveguide layer supported on the top surface of the substrate so that the input and output gratings extend into the waveguide layer, and wherein the waveguide layer has an index of refraction $n_G \geq n_S$ at the operating wavelength and supports multiple guided modes, and
      wherein the input and output gratings provide phase matching so that input light incident upon the input grating is coupled into the waveguide layer and travels in the guided modes to the output grating, and is coupled out of the waveguide layer by the output grating as output light;
   a display apparatus disposed in the back region and that generates the input light; and
   a coupling optical system operably arranged relative to the display apparatus and configured to direct the input light to the input grating of the augmented reality optical system over an input field of view.

22. The augmented reality system according to claim 21, further comprising an imaging optical system operably arranged in the back region to receive the output light from the output grating over an output field of view.

23. The augmented reality system according to claim 21, wherein light from the object or the scene is transmitted through the output grating from the front region to the back region and to the imaging optical system, and wherein the imaging optical system combines the output light and the light from the object or the scene to form an augmented image.

24. The augmented reality system according to claim 21, where the imaging optical system comprises at least one eye of a user.

25. The augmented reality system according to claim 21, wherein the output field of view is in the range from 50° to 70°.

26. The augmented reality system according to claim 21, wherein the input light is polychromatic.

27. An augmented reality system, comprising:
   a waveguide structure comprising a waveguide layer of refractive index $n_G$ and a thickness THG in the range 1 µm≤THG≤100 µm, the waveguide structure supported on a substrate having a refractive index $n_S$, wherein $n_G - n_S \geq 0.5$, and wherein the waveguide structure supports multiple guided modes;
   an input grating and an output grating that each resides within the waveguide layer, wherein the input and output gratings provide phase matching and are laterally spaced apart from one another;
   a front region and a back region;
   a display apparatus disposed in the back region and that generates the input light; and
   a coupling optical system operably arranged relative to the display apparatus and configured to direct the input light to the input grating of the augmented reality optical system over an input field of view.

28. The augmented reality optical system according to claim 27, wherein the waveguide layer comprises a polymer material and the substrate comprises a glass material.

29. The augmented reality optical system according to claim 27, wherein the input and output grating are configured to operate over a visible operating wavelength band.

30. The augmented reality optical system according to claim 27, wherein at least one of the waveguide layer and the substrate are planar.

* * * * *

UNITED STATES PATENT AND TRADEMARK OFFICE
CERTIFICATE OF CORRECTION

PATENT NO. : 10,929,667 B2
APPLICATION NO. : 16/156355
DATED : February 23, 2021
INVENTOR(S) : John Tyler Keech et al.

It is certified that error appears in the above-identified patent and that said Letters Patent is hereby corrected as shown below:

In the Claims

In Column 11, Line 63, Claim 1, delete "ns" and insert -- $n_s$ --, therefor.

In Column 14, Line 11, Claim 24, delete "where" and insert -- wherein --, therefor.

Signed and Sealed this
Eighth Day of August, 2023

Katherine Kelly Vidal
*Director of the United States Patent and Trademark Office*